(12) United States Patent
Sikula

(10) Patent No.: US 7,214,893 B2
(45) Date of Patent: May 8, 2007

(54) LOAD CELL SYSTEM

(75) Inventor: Frank Sikula, Temperance, MI (US)

(73) Assignee: Electric Arc Technologies, LLC, Temperance, MI (US)

( * ) Notice: Subject to any disclaimer, the term of this patent is extended or adjusted under 35 U.S.C. 154(b) by 125 days.

(21) Appl. No.: 11/057,947

(22) Filed: Feb. 15, 2005

(65) Prior Publication Data
US 2006/0180360 A1    Aug. 17, 2006

(51) Int. Cl.
*G01G 21/02*    (2006.01)
(52) U.S. Cl. ............................ 177/238; 177/DIG. 9
(58) Field of Classification Search ........... 177/238, 177/243, 261, DIG. 9
See application file for complete search history.

(56) References Cited

U.S. PATENT DOCUMENTS

| | | | |
|---|---|---|---|
| 3,679,011 A * | 7/1972 | Hawver ............... | 177/134 |
| 3,718,040 A | 2/1973 | Freeman et al. | |
| 3,825,734 A | 7/1974 | Jacobs et al. | |
| 3,877,547 A * | 4/1975 | Willuweit et al. ......... | 184/6.26 |
| 3,915,248 A * | 10/1975 | Paelian ................ | 177/210 R |
| 4,339,010 A | 7/1982 | Malikov et al. | |
| 4,483,404 A * | 11/1984 | Weihs ................ | 177/255 |
| 4,574,899 A | 3/1986 | Griffin | |
| 4,673,047 A | 6/1987 | Harbour | |
| 4,744,254 A * | 5/1988 | Barten ................ | 73/862.622 |
| 4,800,972 A | 1/1989 | Snead | |
| 4,915,183 A | 4/1990 | Molenaar et al. | |
| 5,224,561 A * | 7/1993 | Ahl ................... | 177/163 |
| 5,677,498 A | 10/1997 | Oakes et al. | |
| 5,801,339 A * | 9/1998 | Boult ................. | 177/261 |
| 5,877,433 A | 3/1999 | Matsuzaki et al. | |
| 5,877,454 A | 3/1999 | Uehara et al. | |
| 5,892,181 A | 4/1999 | Takahashi | |
| 6,084,183 A | 7/2000 | Nakazaki | |
| 6,116,096 A | 9/2000 | Takahashi et al. | |
| 6,122,979 A | 9/2000 | Tsuchie et al. | |
| 6,138,505 A | 10/2000 | Miyazaki | |
| 6,253,626 B1 | 7/2001 | Shoberg et al. | |
| 6,273,613 B1 | 8/2001 | O'Brien et al. | |
| 6,362,439 B1 | 3/2002 | Reichow | |
| 6,370,971 B1 | 4/2002 | Olson | |
| 6,433,289 B1 * | 8/2002 | Gurr ................. | 177/238 |
| 6,441,324 B1 | 8/2002 | Stimpson | |
| 6,484,593 B2 | 11/2002 | Lehtovaara | |
| 6,590,168 B2 | 7/2003 | Kawaguchi et al. | |
| 6,647,798 B2 | 11/2003 | Yoshida et al. | |
| 6,651,518 B1 | 11/2003 | Miyazaki | |
| 6,931,947 B2 * | 8/2005 | Schulze et al. ......... | 73/862.381 |
| 2002/0054719 A1 | 5/2002 | Takizawa et al. | |
| 2003/0089530 A1 | 5/2003 | Paine | |

* cited by examiner

*Primary Examiner*—Randy W. Gibson
(74) *Attorney, Agent, or Firm*—Fraser, Clemens, Martin & Miller LLC; J. Douglas Miller

(57) ABSTRACT

A load cell system for stationary or moving equipment is disclosed, wherein undesirable bending, shear, and torsion loads are minimized and an accuracy of the load cell system is maximized.

23 Claims, 5 Drawing Sheets

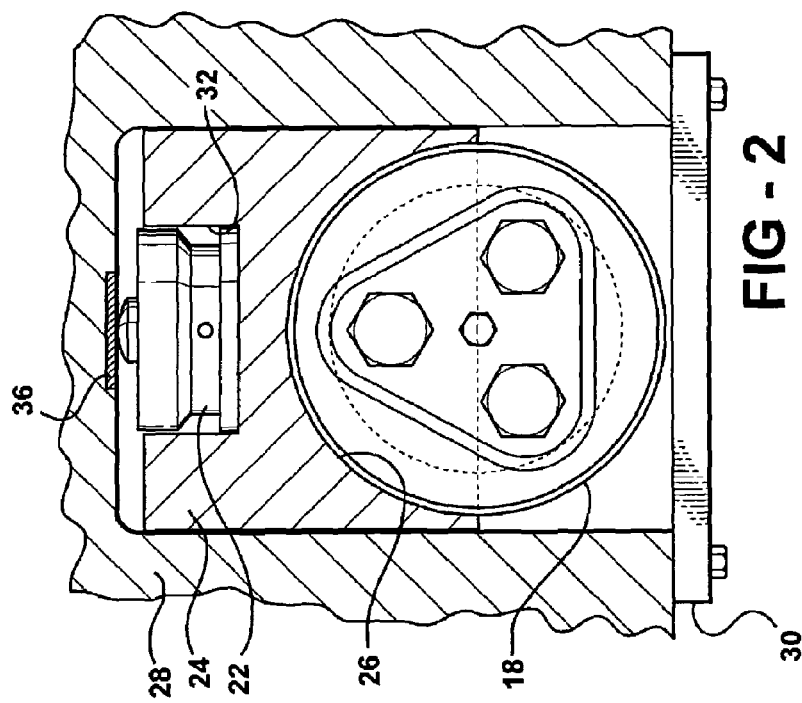
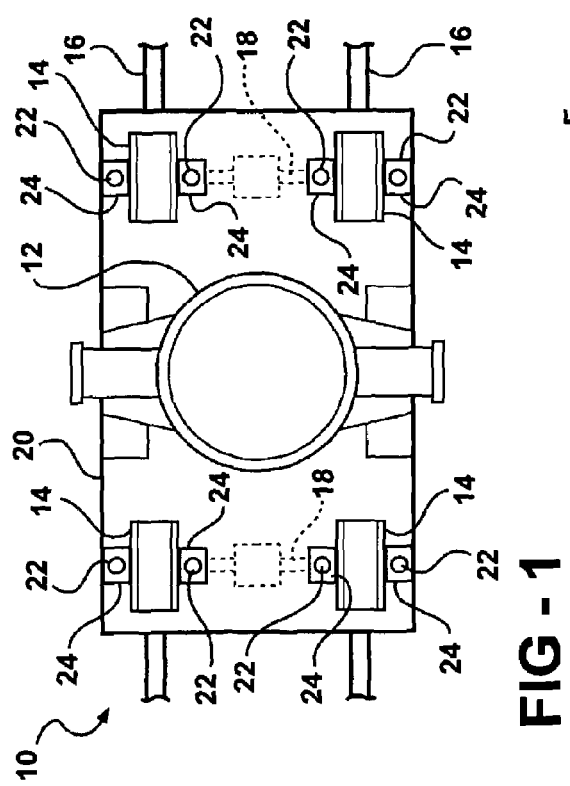
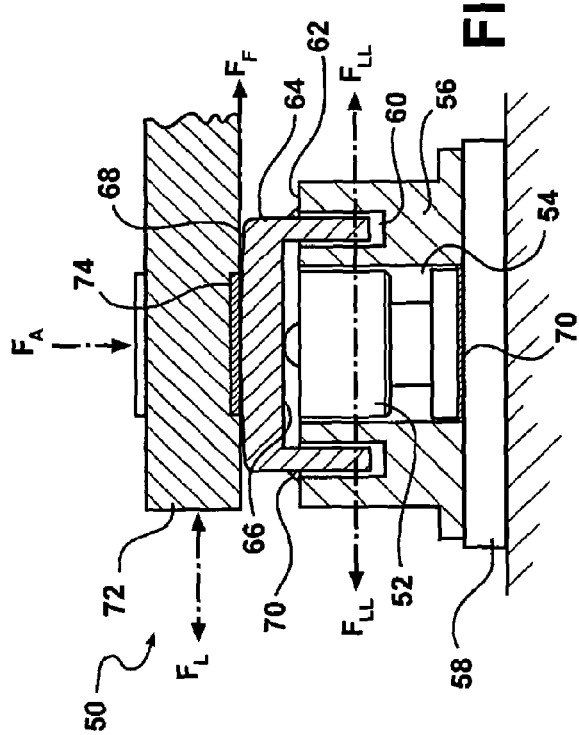

ND CELL SYSTEM

LOAD CELL SYSTEM

FIELD OF THE INVENTION

The invention relates to a load cell system and more particularly to a load cell system for stationary or moving equipment.

BACKGROUND OF THE INVENTION

In typical industrial settings, it is often desirable to obtain a weight of a raw or finished material. It has been a common practice to use load cells for determining this weight. Often, the materials are stored in tanks, hoppers, vehicles, or other containers, for example. One method used to obtain the weight of such containers is to provide a scale built into a floor or other supporting surface. The container is then positioned on the scale to determine the weight thereof.

Another method which is commonly used on moving containers such as cars, railroad cars, and other vehicles is to provide an undercarriage platform and a separate load holding platform which supports the transported load. Load cells are typically placed between the platforms. This system requires elaborate and expensive auxiliary equipment to militate against a misalignment of the platforms in respect of the load cells when the load is placed onto the load holding platform. In steel mills, for example, railroad cars are typically used for loading and transporting iron scrap or molten steel stored in a ladle after the steel has been tapped into the ladle from steel melting equipment. The scrap steel loading process is extremely harsh, and pieces of the scrap can become lodged between the platforms causing the weighing system to become inaccurate or inoperative.

Another typical weighing system used on moving containers such as cars, railroad cars, and other vehicles utilizes weighing beams or modules which are installed on each side of the container. This system can also become elaborate and expensive. In a conventional system, the module consists of two special beams, two load cells, and bushing/pin equipment to keep the load cells from moving or shifting. In steel mills, the heat from the ladle holding the molten steel often causes the load cells and the bushing/pin equipment to fail prematurely. The resulting downtime for repair can be lengthy, resulting in monetary losses.

Another system by the present inventor includes an axle bearing load cell weighing system. These systems integrate separate load holding platform assemblies into one unit. This eliminates auxiliary equipment compared to other methods, which lowers equipment and repair costs. However, lateral forces to the load cell still result in inaccurate weight measurement.

It would be desirable to develop a load cell system wherein undesirable bending, shear, and torsion loads are minimized and an accuracy of the load cell system is maximized.

SUMMARY OF THE INVENTION

Consistent and consonant with the present invention, a load cell system wherein undesirable bending, shear, and torsion loads are minimized and an accuracy of the load cell system is maximized, has surprisingly been discovered.

In one embodiment, the load cell system comprises a first block member having an aperture formed therein; a load cell disposed in the aperture of the first block member; and a cap member supported by the load cell and adapted to support a weight bearing member thereon, the cap member restrained by the first block member to minimize lateral movement of the cap member, wherein the cap member militates against an application of lateral forces on the load cell.

In another embodiment, the load cell system comprises a first block member having an aperture formed therein; a base member supporting the first block member; a load cell disposed in the aperture of the first block member; and a cap member supported by the load cell and adapted to support a weight bearing member thereon, the cap member restrained by the first block member to minimize lateral movement of the cap member, wherein the cap member militates against an application of lateral forces on the load cell.

In another embodiment, the load cell system comprises a first block member having an aperture formed therein; a second block member supporting the first block member; a base member supporting the second block member; a load cell disposed in the aperture of the first block member; and a cap member supported by the load cell and restrained by the first block member to minimize lateral movement of the cap member, wherein the cap member militates against an application of lateral forces on the load cell, a crowned outer surface of the cap member adapted to support a weight bearing member thereon.

DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 1 is a plan view of a railroad car with a ladle disposed thereon and showing load cells disposed at each wheel of the railroad car;

FIG. 2 is a partial sectional view of the load cell system illustrated in FIG. 1;

FIG. 3 is a sectional view of a load cell system according to an embodiment of the invention;

DESCRIPTION OF THE PREFERRED EMBODIMENT

Figure 4:
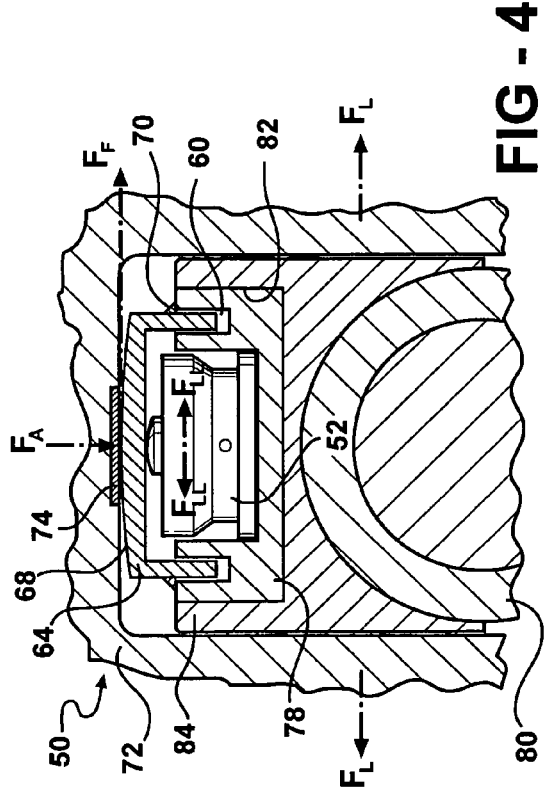
FIG. 4 is a sectional view of the load cell illustrated in FIG. 3 and disposed on an axle of a vehicle.

The following detailed description and appended drawings describe and illustrate various exemplary embodiments of the invention. The description and drawings serve to enable one skilled in the art to make and use the invention, and are not intended to limit the scope of the invention in any manner. For exemplary purposes, a load cell system provided on a ladle car utilized in a steel mill is disclosed. However, it is understood that the load cell system can be used for other applications such as overhead cranes, tanks, vehicles, and load platforms, for example. It is understood that materials other than those described can be used without departing from the scope and spirit of the invention.

FIG. 1 depicts a railroad car 10. The railroad car 10 shown is commonly used in steel mills and includes a ladle 12 disposed thereon for holding molten steel therein. The wheels 14 of the railroad car 10 are adapted to ride on track rails 16. An axle 18 extends between each pair of wheels 14. The weight of the ladle 12 is carried by a main body 20. Load cells 22 disposed in bearing blocks 24 are adapted to provide a weight measurement of the ladle 12, and thus a weight of the molten metal disposed therein can be obtained. Although load cells 22 are shown at each wheel 14 of the railroad car 10, load cells 22 can be disposed at fewer wheels 14 if desired, and a weight of the molten metal extrapolated. Typically, the load cell 22 provides an analog signal that can be converted to a signal usable by any normal control and supervisor equipment such as a display, PLC, PC, and the like.

FIG. 2 shows the load cell 22 and bearing block 24 assembly illustrated in FIG. 1. The bearing block 24 is disposed on the axle 18, which is cradled in a bearing surface 26 having a semicircular cross section formed in the bearing block 24. Alternatively, the bearing block 24 is disposed on a bearing assembly, such as an "AP" bearing assembly produced by Timken, which is pressed on an end of the axle 18 as a sealed unit. The bearing block 24 is substantially surrounded by a frame member 28 which is secured to a load bearing platform 30. The load cell 22 is disposed in a cavity 32 formed in the bearing block 24 and may include a sealing material (not shown) disposed therebetween. The sealing material can be any conventional material such as silicon, for example. A wear plate 36 can be formed in the frame member 28 to militate against excessive wear.

The weight to be measured is born by the frame member 28. Thus, the weight is transferred to the load cell 22. Since the load cells 22 are capable of measuring vertical loads only, any lateral loads or forces applied to the load cell 22 by the frame member 28 result in inaccurate readings of the weight to be measured. Thus, in applications involving a moving body such as the railroad car 10, any instability, unevenness in the railroad tracks, any movement of the molten metal within the ladle 12, etc. will cause lateral forces to be applied to the load cell 22, and result in inaccurate readings. The transfer of lateral forces to the load cell 22 is facilitated by the frictional forces between the wear plate 36 and the load cell 22.

FIG. 3 shows a load cell system 50 according to an embodiment of the invention. The load cell system 50 includes a load cell 52. The load cell can be any conventional type such as the JRT or KMR models manufactured by HBM, Incorporated. In the embodiment shown, the load cell 52 is disposed in an aperture 54 formed in a block member 56. As used herein, the block member 56 includes a bearing block or a rigid member capable of supporting weight. The block member 56 and the load cell 52 are supported by a base member 58. It is understood that block member 56 can extend under the load cell 52 to support the load cell 52, with the block member 56 ultimately being supported by the base member 58, without departing from the scope and spirit of the invention. A base member 58 as used herein also includes an axle bearing or an axle as disclosed in other embodiments.

An annular cavity 60 is formed in the block member 56 at an end 62 opposite the base member 58. A cap member 64 is inserted into the cavity 60, and an inner surface 66 of the closed end abuts the load cell 52. The cap member 64 is restrained in the cavity 60 to militate against relative lateral movement between the block member 56 and the cap member 64. An outer surface 68 of the closed end of the cap member 64 is crowned. Crowned as used herein means having a peak, sloped, rounded, hemispherical, forming a segment a sphere, catenoid, and the like. The outer surface 68 can be coated with a lubricious material such as tetrafluoroethylene (TFE), for example, if desired. A sealing material 70 such as silicon, for example, is disposed around a peripheral edge of the cap member 64 adjacent the end 62 of the block member 56.

A weight bearing member 72 is supported by the cap member 64 and abuts the outer surface 68 of the closed end thereof. It is understood that additional load cell systems 50 can be used as desired to support the weight bearing member 72. A wear plate 74 is disposed in the weight bearing member 72 in the area where the weight bearing member 72 abuts the cap member 64. It is understood that the wear plate 74 can be omitted without departing from the scope and spirit of the invention. The weight bearing member 72 can be any member supporting a weight thereon or capable of supporting a weight thereon. Thus, a vertical force component $F_A$ is exerted on the weight bearing member 72. Additionally, a lateral force component $F_L$ is exerted on the weight bearing member 72. The lateral force $F_L$ as shown appears on a single axis, however, the lateral force $F_L$ represents the sum of the force components along the two horizontal axes present. A frictional force component $F_F$ exists between the cap member 64 and the weight bearing member 72 in the area where the crowned outer surface 68 of the cap member 64 abuts the weight bearing member 72.

In operation, a total force is applied to the load cell system 50 through the weight bearing member 72. The total force includes the vertical force $F_A$ component and the lateral force $F_L$ component. Additionally, any lateral motion or lateral force $F_L$ components will result in the frictional force $F_F$ component between the cap member 64 and the weight bearing member 72. The restraint of the cap member 64 by the block member 56, the crowning of the outer surface 68 of the cap member 64, and the lubricious coating if applied, individually or in combination, result in a minimization of a lateral force $F_{LL}$ applied to the load cell 52. Thus, the total force exerted on the load cell 52 is substantially equal to the vertical force $F_A$, thereby maximizing the accuracy of the load cell 52.

FIG. 4 illustrates an embodiment of the invention wherein the load cell system 50 of FIG. 3 is disposed on an axle bearing 80 of a vehicle such as a railroad car, for example. Elements repeated from FIG. 3 have the same reference numerals in FIG. 4. A first block member 78 is disposed in a cavity 82 formed in a second block member 84 which is supported by the axle bearing 80, or a bearing assembly as described and shown in FIGS. 1 and 2. The first block member 78 is restrained in the cavity 82 to militate against relative lateral movement between the first block member 78 and the second block member 84.

Therefore, as described for the embodiment disclosed in FIG. 4, the restraint of the cap member 64 by the first block member 78 and the second block member 84, the crowning of the outer surface 68 of the cap member 64, and the lubricious coating if applied, cooperate to result in a minimization of a lateral force $F_{LL}$ applied to the load cell 52. Thus, the total force exerted on the load cell 52 is substantially equal to the vertical force $F_A$, thereby maximizing the accuracy of the load cell 52.

Figure 5:
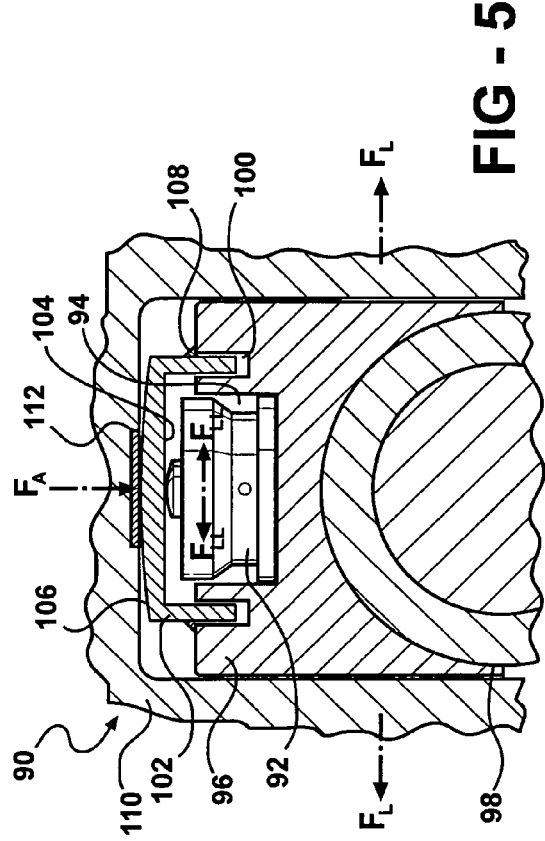
FIG. 5 is a sectional view of a load cell system according to another embodiment of the invention.

FIG. 5 illustrates a load cell system 90 according to another embodiment of the invention. The load cell system 90 includes a load cell 92. The load cell 92 is disposed in an aperture 94 formed in a block member 96. The block member 96 and the load cell 92 are supported by an axle bearing 98. A bearing assembly as described and shown in FIGS. 1 and 2 can also be used.

An annular cavity 100 is formed in the block member 96. A cap member 102 is inserted into the cavity 100 and an inner surface 104 of the closed end of the cap member 102 abuts the load cell 92. The cap member 102 is restrained in the cavity 100 to militate against relative lateral movement between the block member 96 and the cap member 102. An outer surface 106 of the closed end of the cap member 102 is crowned. The outer surface 106 can be coated with a lubricious material such as tetrafluoroethylene (TFE), for example, if desired. A sealing material 108 such as silicon, for example, is disposed around a peripheral edge of the cap member 102 adjacent the block member 96.

A weight bearing member 110 is supported by the cap member 102 and abuts the outer surface 106 of the closed end thereof. Additional load cell systems 90 can be used as desired to support the weight bearing member 110. A wear plate 112 is disposed in the weight bearing member 110 in the area where the weight bearing member 110 abuts the cap member 102. It is understood that the wear plate 112 can be omitted without departing from the scope and spirit of the invention. The weight bearing member 110 can be any member supporting a weight thereon or capable of supporting a weight thereon such as a vehicle frame, for example. Thus, as previously described for FIG. 3, a vertical force component $F_A$ is exerted on the weight bearing member 110, a lateral force component $F_L$ is exerted on the weight bearing member 110, and a frictional force component $F_F$ exists between the cap member 102 and the weight bearing member 110 in the area where the crowned outer surface 106 of the cap member 102 abuts the weight bearing member 110.

In operation, a total force is applied to the load cell system 90 through the weight bearing member 110. The total force includes the vertical force $F_A$ component and the lateral force $F_L$ component. Additionally, any lateral motion or lateral force $F_L$ components will result in the frictional force $F_F$ component between the cap member 102 and the weight bearing member 110. The restraint of the cap member 102 by the block member 96, the crowning of the outer surface 106 of the cap member 102, and the lubricious coating if applied, individually or in combination, result in a minimization of a lateral force $F_{LL}$ applied to the load cell 92. Thus, the total force exerted on the load cell 92 is substantially equal to the vertical force $F_A$, thereby maximizing the accuracy of the load cell 92.

Figure 6:
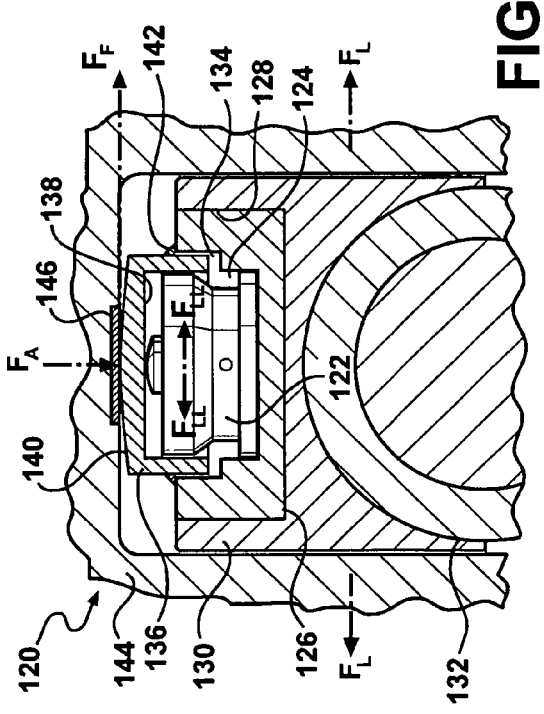
FIG. 6 is a sectional view of a load cell system according to another embodiment of the invention.

FIG. 6 illustrates a load cell system 120 according to another embodiment of the invention. The load cell system 120 includes a load cell 122. The load cell 122 is disposed in an aperture 124 formed in a first block member 126. The first block member 126 is disposed in a cavity 128 formed in a second block member 130. The second block member 130 is supported by an axle bearing 132. A bearing assembly as described and shown in FIGS. 1 and 2 can also be used. The first block member 126 is restrained in the cavity 128 to militate against relative lateral movement between the first block member 126 and the second block member 130.

An annular cavity 134 is formed in the first block member 126 in communication with and surrounding the aperture 124. A cap member 136 is inserted into the cavity 134 and an inner surface 138 of the closed end of the cap member 136 abuts the load cell 122. The cap member 136 is restrained in the cavity 134 to militate against relative lateral movement between the first block member 126 and the cap member 136. An outer surface 140 of the closed end of the cap member 136 is crowned. The outer surface 140 can be coated with a lubricious material such as tetrafluoroethylene (TFE), for example, if desired. A sealing material 142 such as silicon, for example, is disposed around a peripheral edge of the cap member 136 adjacent the first block member 126.

A weight bearing member 144 is supported by the cap member 136 and abuts the outer surface 140 of the closed end thereof. Additional load cell systems 120 can be used as desired to support the weight bearing member 144. A wear plate 146 is disposed in the weight bearing member 144 in the area where the weight bearing member 144 abuts the cap member 136. It is understood that the wear plate 146 can be omitted without departing from the scope and spirit of the invention. The weight bearing member 144 can be any member supporting a weight thereon or capable of supporting a weight thereon such as a vehicle frame, for example.

As previously described for FIG. 3, a vertical force component $F_A$ is exerted on the weight bearing member 144, a lateral force component $F_L$ is exerted on the weight bearing member 144, and a frictional force component $F_F$ exists between the cap member 136 and the weight bearing member 144 in the area where the crowned outer surface 140 of the cap member 136 abuts the weight bearing member 144.

In operation, a total force is applied to the load cell system 120 by the weight bearing member 144. The total force includes the vertical force $F_A$ component and the lateral force $F_L$ component. Additionally, any lateral motion or lateral force $F_L$ components will result in the frictional force $F_F$ component between the cap member 136 and the weight bearing member 144. The restraint of the cap member 136 by the first block member 126 and the second block member 130, the crowning of the outer surface 140 of the cap member 136, and the lubricious coating if applied, individually or in combination, result in a minimization of a lateral force $F_{LL}$ applied to the load cell 122. Thus, the total force exerted on the load cell 122 is substantially equal to the vertical force $F_A$, thereby maximizing the accuracy of the load cell 122.

Figure 7:
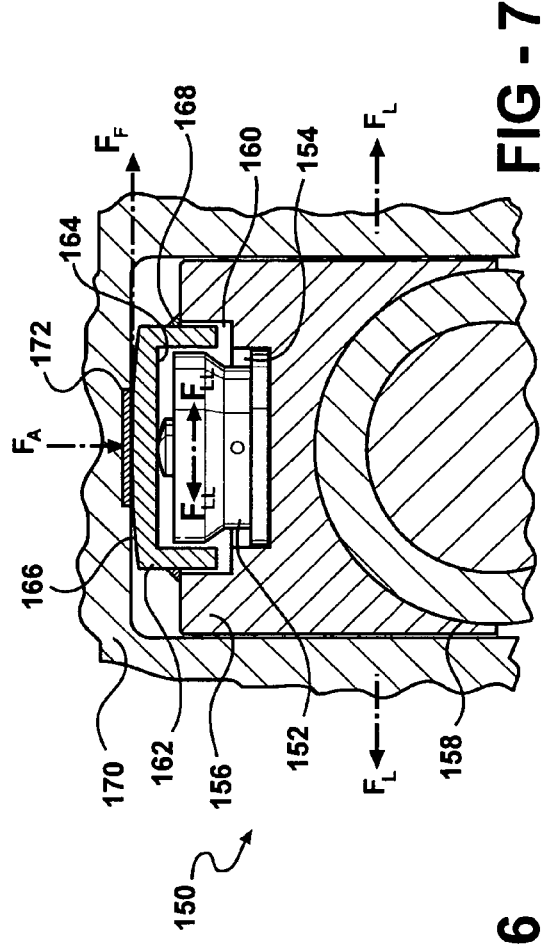
FIG. 7 is a sectional view of a load cell system according to another embodiment of the invention.

In FIG. 7, a load cell system 150 is shown according to another embodiment of the invention. The load cell system 150 includes a load cell 152. The load cell 152 is disposed in an aperture 154 formed in a block member 156. The block member 156 and the load cell 152 are supported by an axle bearing 158. A bearing assembly as described and shown in FIGS. 1 and 2 can also be used.

An annular cavity 160 is formed in the block member 156. A cap member 162 is inserted into the cavity 160 and an inner surface 164 of the closed end of the cap member 162 abuts the load cell 152. The cap member 162 is restrained in the cavity 160 to militate against relative lateral movement between the block member 156 and the cap member 162. An outer surface 166 of the closed end of the cap member 162 is crowned. The outer surface 166 can be coated with a lubricious material such as tetrafluoroethylene (TFE), for example, if desired. A sealing material 168 such as silicon, for example, is disposed around a peripheral edge of the cap member 162 adjacent the block member 156.

A weight bearing member 170 is supported by the cap member 162 and abuts the outer surface 166 of the closed end thereof. Additional load cell systems 150 can be used as desired to support the weight bearing member 170. A wear plate 172 is disposed in the weight bearing member 170 in the area where the weight bearing member 170 abuts the cap member 162. It is understood that the wear plate 172 can be omitted without departing from the scope and spirit of the invention. The weight bearing member 170 can be any member supporting a weight thereon or capable of supporting a weight thereon such as a vehicle frame, for example. Thus, as previously described for FIG. 3, a vertical force component $F_A$ is exerted on the weight bearing member 170, a lateral force component $F_L$ is exerted on the weight bearing member 170, and a frictional force component $F_F$ exists between the cap member 162 and the weight bearing member 170 in the area where the crowned outer surface 166 of the cap member 162 abuts the weight bearing member 170.

In operation, a total force is applied to the load cell system 150 by the weight bearing member 170. The total force includes the force vertical force $F_A$ component and the lateral force $F_L$ component. Additionally, any lateral motion or lateral force $F_L$ components will result in the frictional force $F_F$ component between the cap member 162 and the weight bearing member 170. The restraint of the cap member 162 by the block member 156, the crowning of the outer surface 166 of the cap member 162, and the lubricious coating if applied, individually or in combination, result in a minimization of a lateral force $F_{LL}$ applied to the load cell 152. Thus, the total force exerted on the load cell 152 is substantially equal to the vertical force $F_A$, thereby maximizing the accuracy of the load cell 152.

Figure 8:
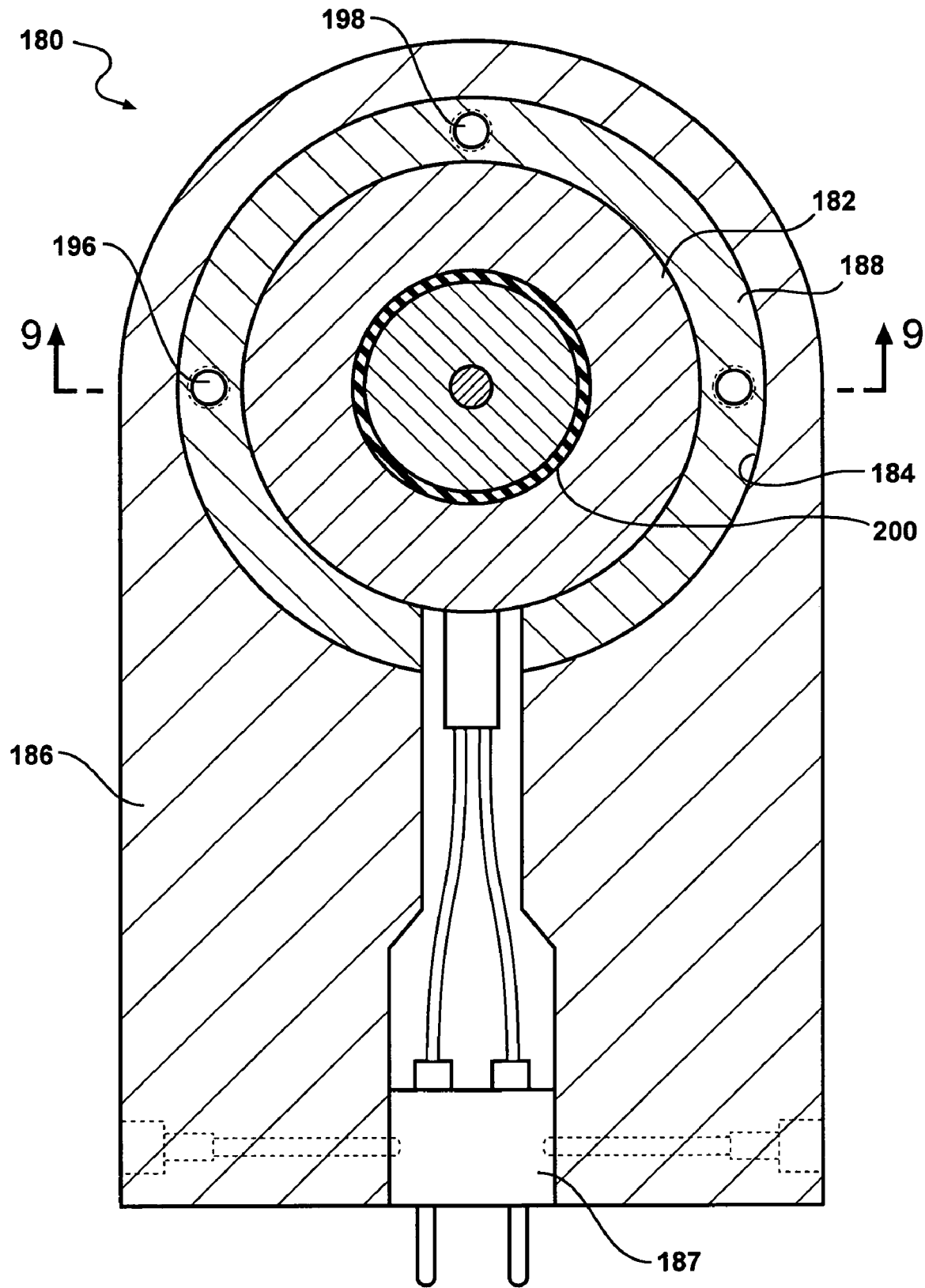
FIG. 8 is a plan view of a load cell system according to another embodiment of the invention showing the load cell system disposed in a removable cassette.
Figure 9:
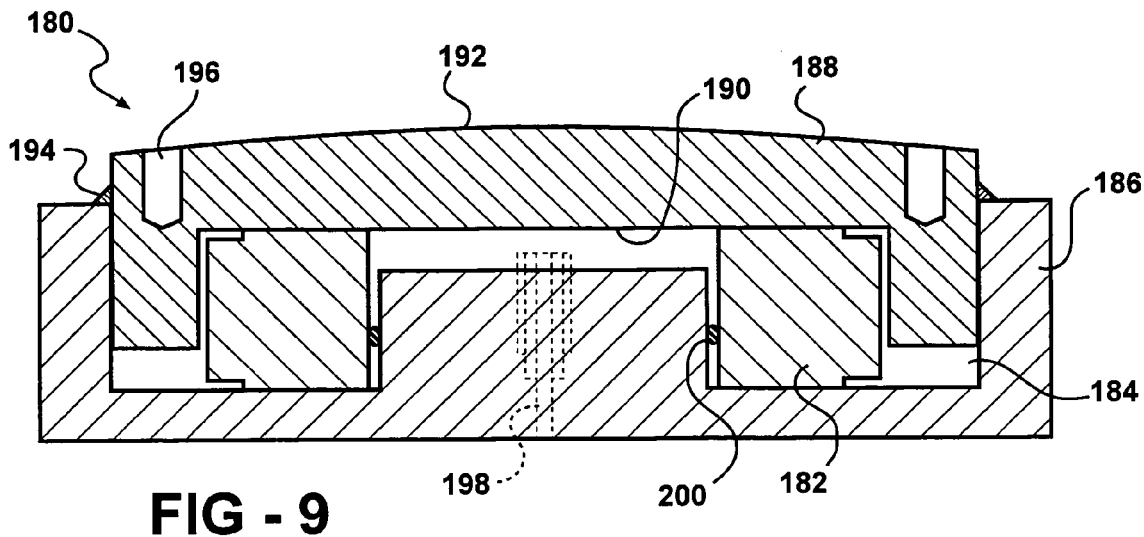
FIG. 9 is a sectional view of the load cell system illustrated in FIG. 8 taken along line 9—9.

FIGS. 8 and 9 illustrate a load cell system 180 according to another embodiment of the invention. The load cell system 180 includes a load cell 182. The load cell 182 is disposed in an annular cavity 184 formed in a block member 186. In the embodiment shown, the block member 186 is a cassette which is capable of holding the load cell system 180 components therein. The cassette includes electrical components 187 including wiring in communication with the load cell and an electrical plug for electrically connecting the load cell with other electrical or electronic components as desired.

A cap member 188 is inserted into the cavity 184 to substantially surround the load cell 182. An inner surface 190 of the closed end of the cap member 188 abuts the load cell 182. The cap member 188 is restrained in the cavity 184 to militate against relative lateral movement between the block member 186 and the cap member 188. An outer surface 192 of the closed end of the cap member 188 is crowned. The outer surface 192 can be coated with a lubricious material such as tetrafluoroethylene (TFE), for example, if desired. A sealing material 194 such as silicon, for example, is disposed around a peripheral edge of the cap member 188 adjacent the block member 186. Apertures 196 can be provided to aid in removal of the cap member 188 from the cavity 184 with a tool or a threaded fastener. A locking pin 198 extends from the block member 186 into an aperture formed in the cap member 188 to militate against a rotation of the cap member 188 in the cavity 184. An O-ring 200 is disposed between the load cell 182 and the block member 186 to maximize a stabilization of the load cell 182.

A weight bearing member (not shown) is supported by the cap member 188 and abuts the outer surface 192 of the closed end thereof. Additional load cell systems 180 can be used as desired to support the weight bearing member. The weight bearing member can be any member supporting a weight thereon or capable of supporting a weight thereon such as a vehicle frame, for example. The application of forces to the load cell system 180 and the operation of the load cell system 180 are the same as previously described for the other embodiments of the invention. Thus, a total force exerted on the load cell 182 is substantially equal to a vertical force $F_A$, thereby maximizing the accuracy of the load cell 152.

Figure 10:
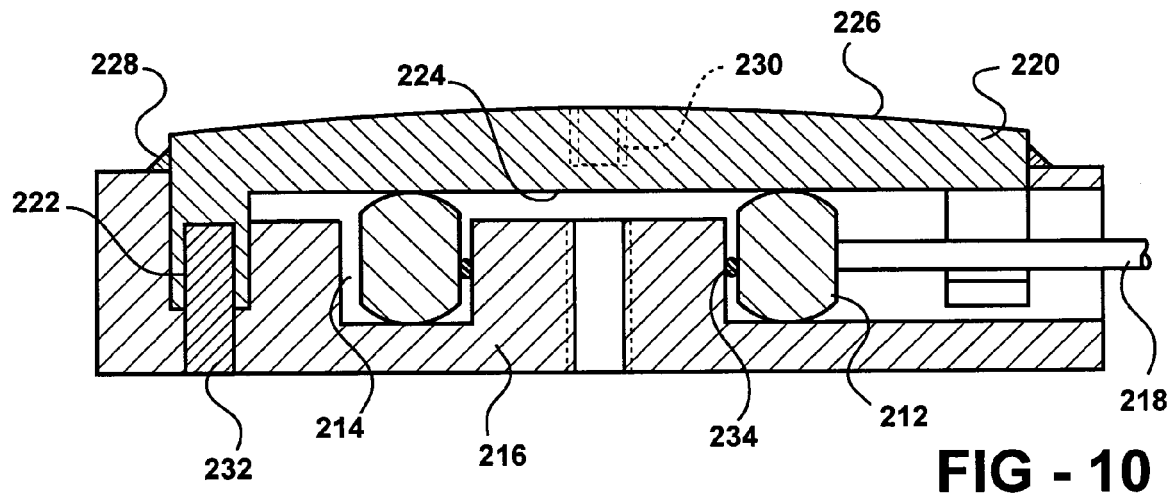
FIG. 10 is a sectional view of a load cell system according to another embodiment of the invention.

In FIG. 10, another embodiment of a load cell system 210 is illustrated. The load cell system 210 includes a load cell 212. The load cell 212 is disposed in a first annular cavity 214 formed in a block member 216. In the embodiment shown, the block member 216 is a cassette as shown if FIG. 8 which is capable of holding the load cell system 210 components therein. The cassette includes electrical components 218 which may include wiring in communication with the load cell 212 and an electrical plug for electrically connecting the load cell with other electrical or electronic components as desired.

A cap member 220 is inserted into a second annular cavity 222 formed in the block member 216 radially outward of the first annular cavity 214. An inner surface 224 of the closed end of the cap member 220 abuts the load cell 212. The cap member 220 is restrained in the second annular cavity 222 to militate against relative lateral movement between the block member 216 and the cap member 220. An outer surface 226 of the closed end of the cap member 220 is crowned. The outer surface 226 can be coated with a lubricious material such as tetrafluoroethylene (TFE), for example, if desired. A sealing material 228 such as silicon, for example, is disposed around a peripheral edge of the cap member 220 adjacent the block member 216. Apertures 230 can be provided to aid in removal of the cap member 220 from the second annular cavity 222 with a tool or a threaded fastener. A locking pin 232 extends from the block member 216 into an aperture formed in the cap member 220 to militate against a rotation of the cap member 220 in the second annular cavity 222. An O-ring 234 is disposed between the load cell 212 and the block member 216 to maximize a stabilization of the load cell 212.

A weight bearing member (not shown) is supported by the cap member 220 and abuts the outer surface 226 of the closed end thereof. Additional load cell systems 210 can be used as desired to support the weight bearing member. The weight bearing member can be any member supporting a weight thereon or capable of supporting a weight thereon such as a vehicle frame, for example. The application of forces to the load cell system 210 and the operation of the load cell system 210 are the same as previously described for the other embodiments of the invention. Thus, a total force exerted on the load cell 212 is substantially equal to a vertical force $F_A$, thereby maximizing the accuracy of the load cell 212.

Figure 11:
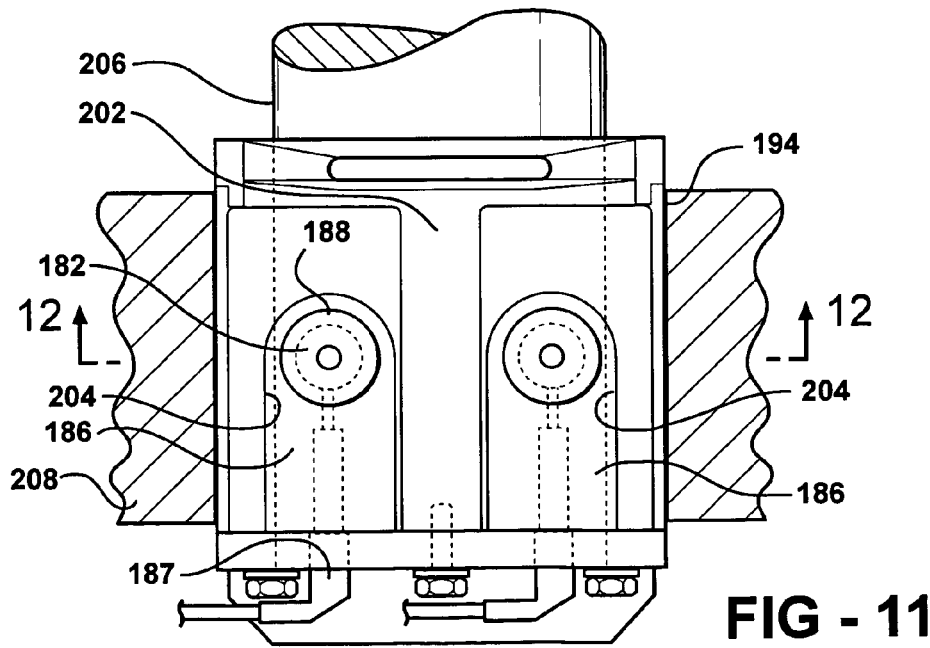
FIG. 11 is a plan view of a load cell system showing two cassettes as illustrated in FIGS. 9 and 10 disposed on a vehicle axle.
Figure 12:
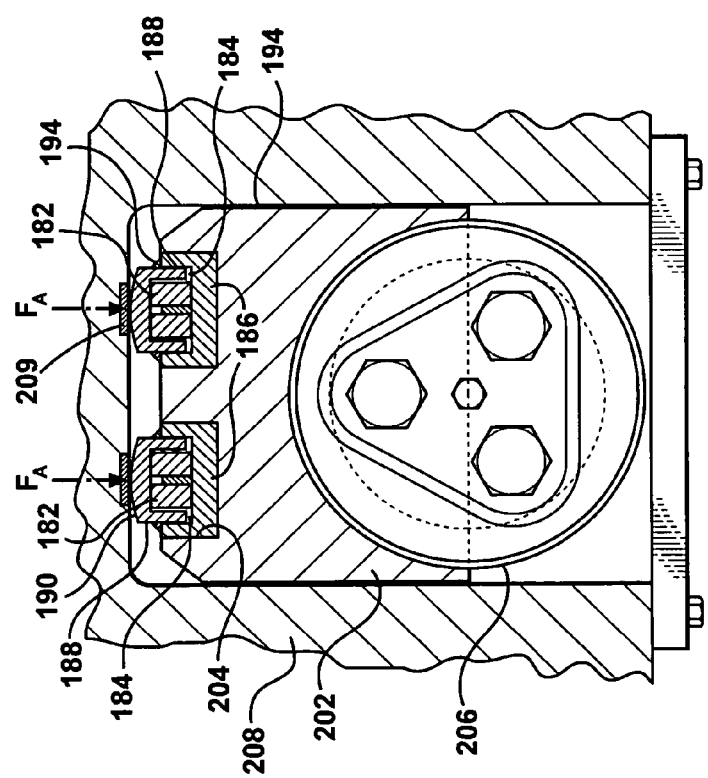
FIG. 12 is a partial sectional view of the load cell system illustrated in FIG. 11 taken along line 12—12.

In the embodiment shown in FIGS. 11 and 12 two load cell systems 180, including the block member 186, are disposed in a second block member 202. The second block member 202 includes a slot 204 formed therein adapted to receive the block member 186. The slot facilitates a removal of each of the block members 186 for inspection, repair, or replacement thereof without removing the second block member 202. The second block member 202 is supported by an axle bearing 206. A bearing assembly as described and shown in FIGS. 1 and 2 can also be used.

A weight bearing member 208 is supported by the cap members 188 and abuts the outer surfaces 192 of the closed ends thereof. The weight bearing member 208 can be any member supporting a weight thereon or capable of supporting a weight thereon such as a vehicle frame, for example. A wear plate 209 is disposed in the weight bearing member 208 in the area where the weight bearing member 208 abuts the cap member 188. It is understood that the wear plate 209 can be omitted without departing from the scope and spirit of the invention. The application of forces to the load cell system 180 and the operation of the load cell system 180 are the same as previously described for the other embodiments of the invention. Thus, a total force exerted on the load cell 182 is substantially equal to a vertical force $F_4$, thereby maximizing the accuracy of the load cell 182. In the embodiment shown, the sealing material 194 is disposed between the second block member 202 and the weight bearing member 208 to maximize stability.

Figure 13:
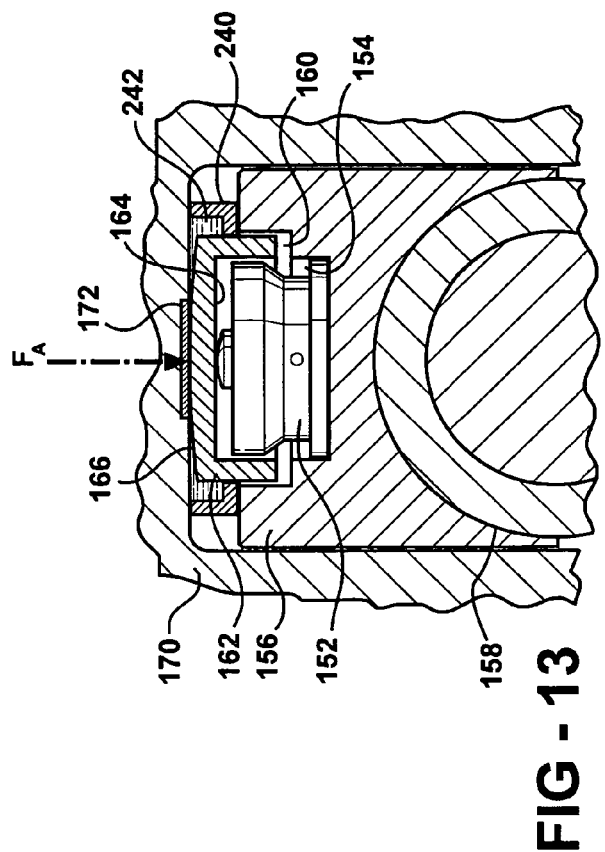
FIG. 13 is a sectional view of a load cell system according to another embodiment of the invention including lubrication means.

FIG. 13 illustrates the load cell system 150 shown in FIG. 7, according to another embodiment of the invention. For like structure from FIG. 7, the same reference numerals are used. The embodiment shown includes a lubrication cartridge 240 disposed around the periphery of the cap member 162. A lubricant 242 such as grease, for example, is disposed within the cartridge 240. The lubricant is in communication with the outer surface 166 of the cap member 166 to minimize frictional forces between the cap member 166 and the weight bearing member 170. The cartridge 240 can be used in conjunction with or in place of the lubricious coating disposed on the outer surface 166, as desired. It is understood that the lubrication cartridge 240 can be used with any of the embodiments of the invention.

Figure 14:
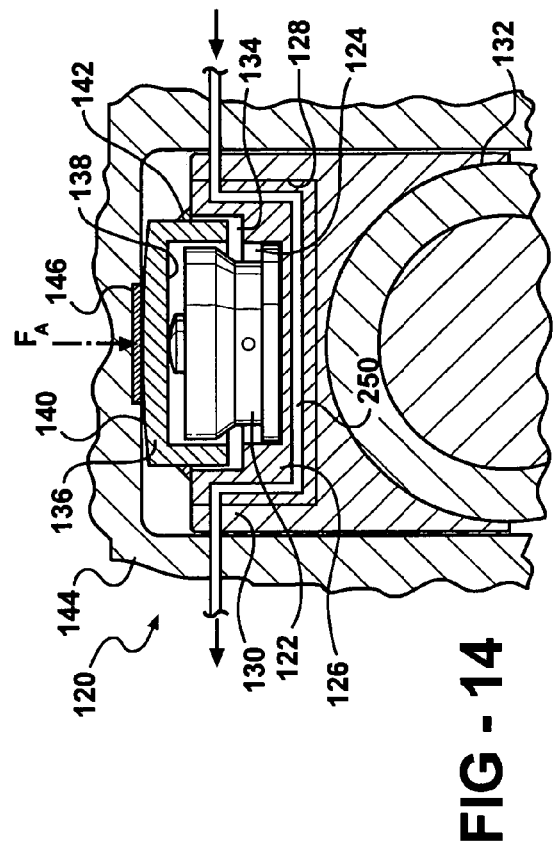
FIG. 14 is a sectional view of a load cell system according to another embodiment of the invention including cooling means.

In FIG. 14, the load cell system 120 of FIG. 6 is shown according to another embodiment of the invention. For like structure from FIG. 6, the same reference numerals are used. In the embodiment shown, a cooling conduit 250 is formed in the first block member 126. The cooling conduit 250 is in communication with a source of coolant (not shown). A flow of coolant through the cooling conduit 250 is indicated by the arrows. The cooling conduit 250 facilitates a removal of heat from the load cell system 120 in applications exposing the load cell system 120 to heat, such as a vehicle in a steel plant, for example. It is understood that the cooling conduit 250 can be used with any of the embodiments of the invention, including those providing the lubrication cartridge 240.

The various embodiments of the load cell systems of the present invention protect the load cell from being negatively affected by undesirable design induced side/torque forces and other factors such as friction, wear, temperature, environmental, electrical, electro-magnetic, and electrostatic interferences. Thus, the dependability, reliability, accuracy, and vitality of load cell systems produced according to the present invention are maximized.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A load cell system comprising:
   a first block member having an aperture formed therein;
   a load cell disposed in the aperture of said first block member; and
   a cap member supported by said load cell and adapted to support a weight bearing member thereon, said cap member restrained by said first block member to minimize lateral and pivotal movement of said cap member, wherein said cap member militates against an application of lateral forces on said load cell.

2. The load cell system according to claim 1, wherein said first block member is adapted to be supported by a base member.

3. The load cell system according to claim 2, wherein the base member is an axle bearing.

4. The load cell system according to claim 2, wherein the base member is a bearing assembly.

5. The load cell system according to claim 1, wherein said first block member includes an annular cavity formed therein radially outwardly of the aperture of said first block member, the annular cavity adapted to receive said cap member therein.

6. The load cell system according to claim 1, further comprising a second block member supporting said first block member.

7. The load cell system according to claim 1, wherein an outer surface of said cap member adapted to support the weight bearing member is crowned.

8. The load cell system according to claim 1, further comprising a lubricant cartridge having a lubricant in communication with an outer surface of said cap member adapted to support the weight bearing member.

9. The load cell system according to claim 1, further comprising a cooling conduit formed in said first block member and adapted to communicate with a source of coolant.

10. A load cell system comprising:
    a first block member having an aperture formed therein;
    a base member supporting said first block member;
    a load cell disposed in the aperture of said first block member; and
    a cap member supported by said load cell and adapted to support a weight bearing member thereon, said cap member restrained by said first block member to minimize lateral and pivotal movement of said cap member, wherein said cap member militates against an application of lateral forces on said load cell.

11. The load cell system according to claim 10, wherein said first block member includes an annular cavity formed therein radially outwardly of the aperture of said first block member, the annular cavity adapted to receive said cap member therein.

12. The load cell system according to claim 10, further comprising a second block member supporting said first block member.

13. The load cell system according to claim 10, wherein an outer surface of said cap member adapted to support the weight bearing member is crowned.

14. The load cell system according to claim 10, further comprising a lubricant cartridge having a lubricant in communication with an outer surface of said cap member adapted to support the weight bearing member.

15. The load cell system according to claim 10, further comprising a cooling conduit formed in said first block member and adapted to communicate with a source of coolant.

16. A load cell system comprising:
    a first block member having an aperture formed therein;
    a second block member supporting said first block member;

a base member supporting said second block member;

a load cell disposed in the aperture of said first block member; and a cap member supported by said load cell and restrained by said first block member to minimize lateral and pivotal movement of said cap member, wherein said cap member militates against an application of lateral forces on said load cell, a crowned outer surface of said cap member adapted to support a weight bearing member thereon.

17. The load cell system according to claim 16, wherein said first block member includes an annular cavity formed therein radially outwardly of the aperture of said first block member, the annular cavity adapted to receive said cap member therein.

18. The load cell system according to claim 16, further comprising a lubricant cartridge having a lubricant in communication with the outer surface of said cap member.

19. The load cell system according to claim 16, further comprising a cooling conduit formed in said first block member and adapted to communicate with a source of coolant.

20. The load cell system according to claim 16, wherein said second block member is a cassette.

21. The load cell system according to claim 1, wherein the cap member has an inner surface, at least a portion of the inner surface being adjacent the load cell.

22. The load cell system according to claim 1, wherein a sealing material is disposed around a peripheral edge of the cap member and adjacent the first block member.

23. The load cell system according to claim 1, wherein the cap member has an outer surface comprising a lubricous coating.

* * * * *